United States Patent

Shaw

[15] 3,670,510

[45] June 20, 1972

[54] PROPELLER WASH DIVERSION APPARATUS FOR PIPE BARGE

[72] Inventor: Clarence W. Shaw, Metairie, La.

[73] Assignee: J. Ray McDermott & Co., Inc., New Orleans, La.

[22] Filed: Oct. 7, 1970

[21] Appl. No.: 78,882

Related U.S. Application Data

[60] Division of Ser. No. 587,288, Oct. 17, 1966, Pat. No. 3,533,244.

[52] U.S. Cl. ................................61/72.1, 61/72.3, 114/163
[51] Int. Cl. ..........................................B63b 35/04, F16l 1/00
[58] Field of Search ..................61/72.3, 72.1, 72.4; 114/163

[56] References Cited

UNITED STATES PATENTS

| 3,273,346 | 9/1966 | Delaruelle et al. | 61/72.3 |
| 2,924,328 | 2/1960 | Lidderdale | 61/72.3 |
| 3,331,212 | 7/1967 | Cox et al. | 61/72.3 |
| 3,101,693 | 8/1963 | Schilling | 114/163 |

*Primary Examiner*—Jacob Shapiro
*Attorney*—Arnold, White & Durkee

[57] ABSTRACT

In pipe lay barges where the pipeline enters the water off the rear of the barge proximate the propulsion apparatus for the barge, rudderlike vanes are provided rearwardly of the propellers to deflect the propeller wash laterally with respect to the pipeline and thus prevent the turbulence from the propellers from affecting the pipeline being laid.

7 Claims, 9 Drawing Figures

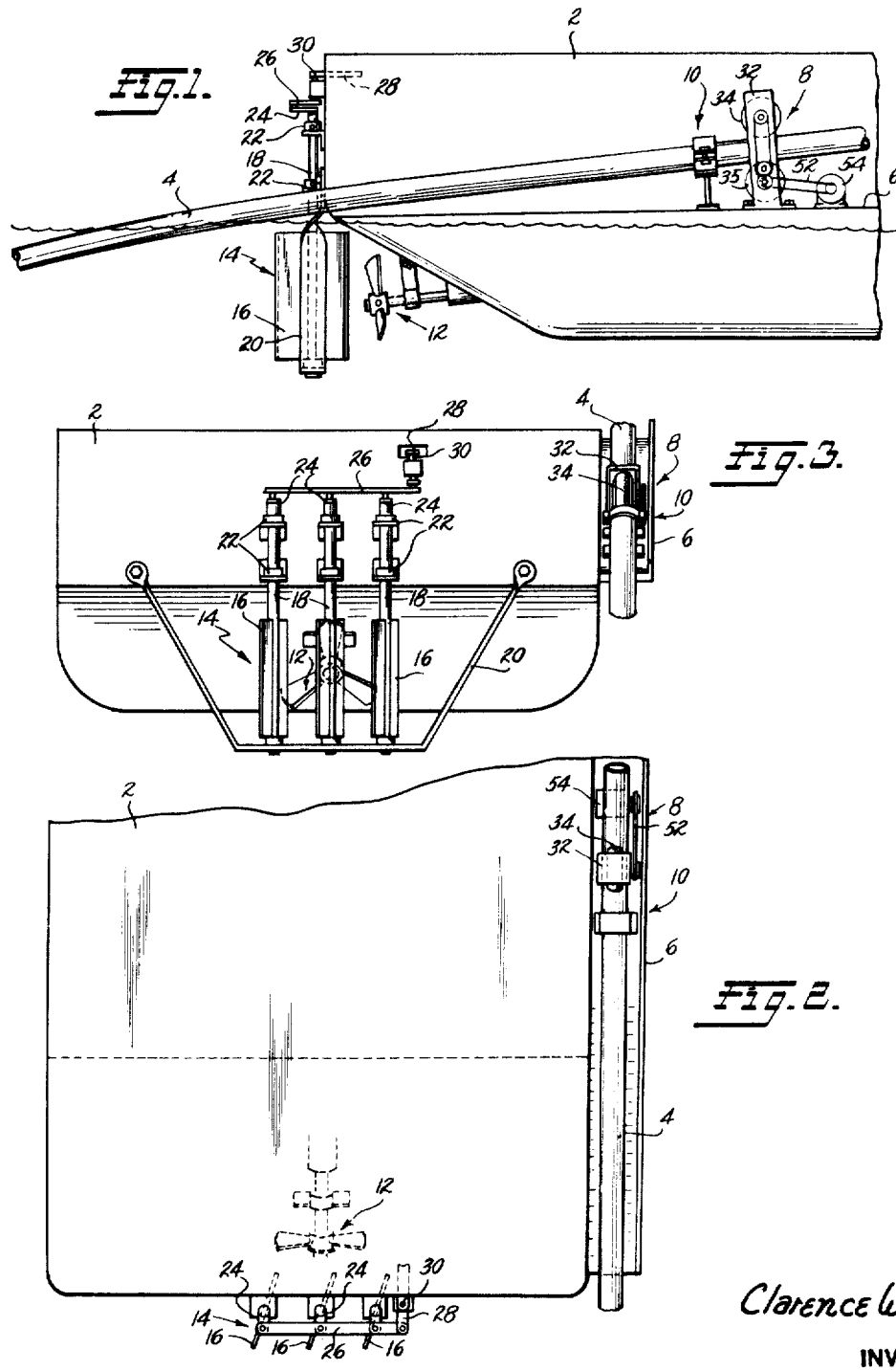

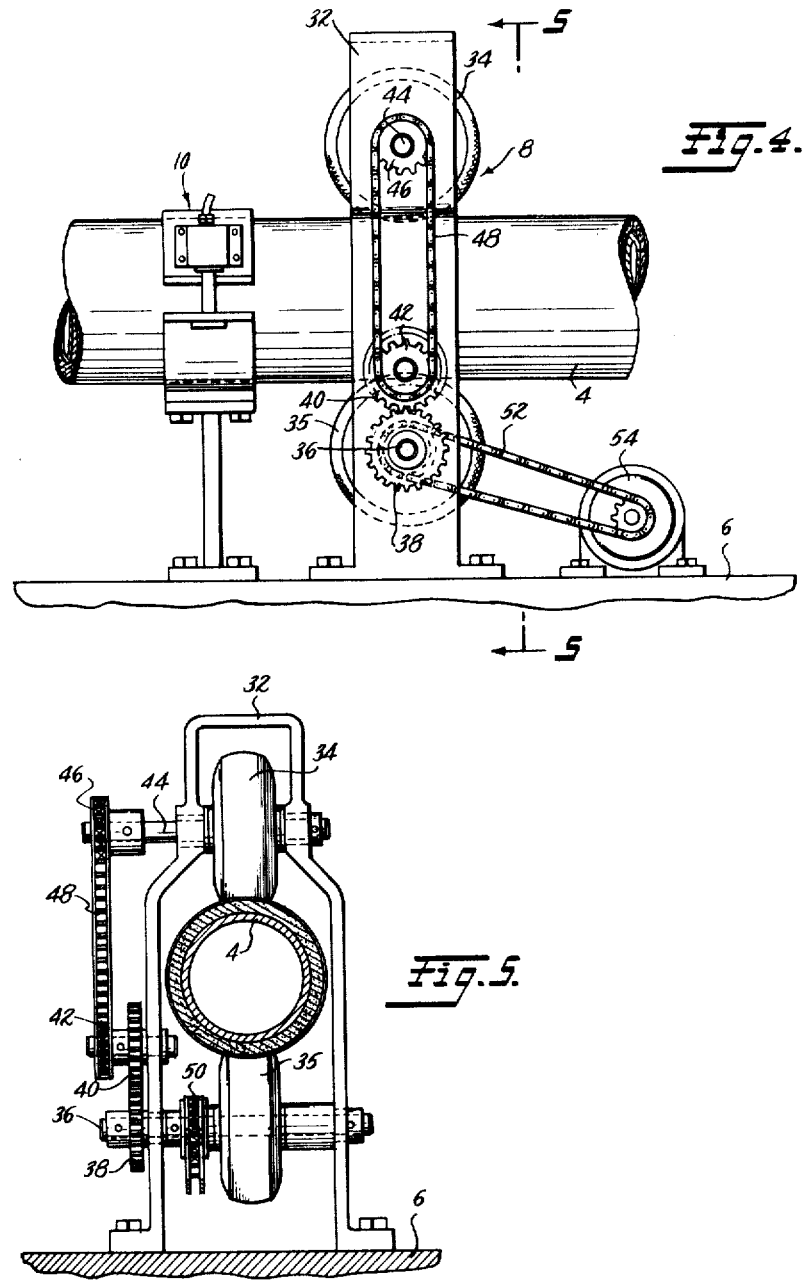

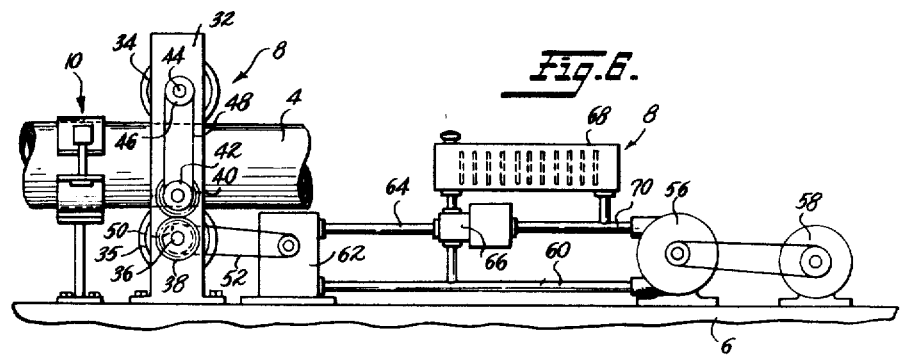
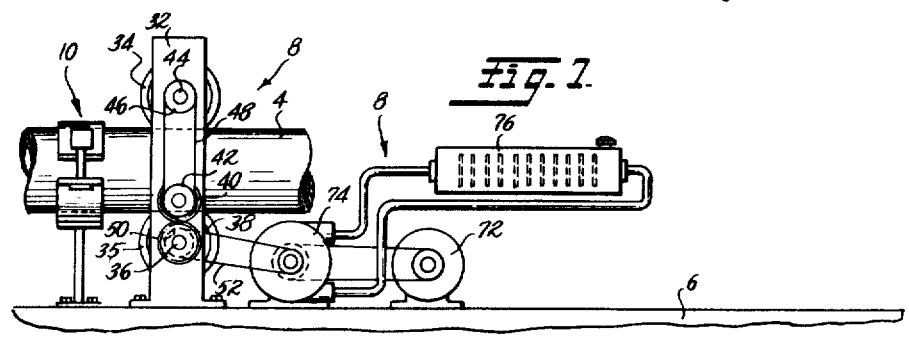
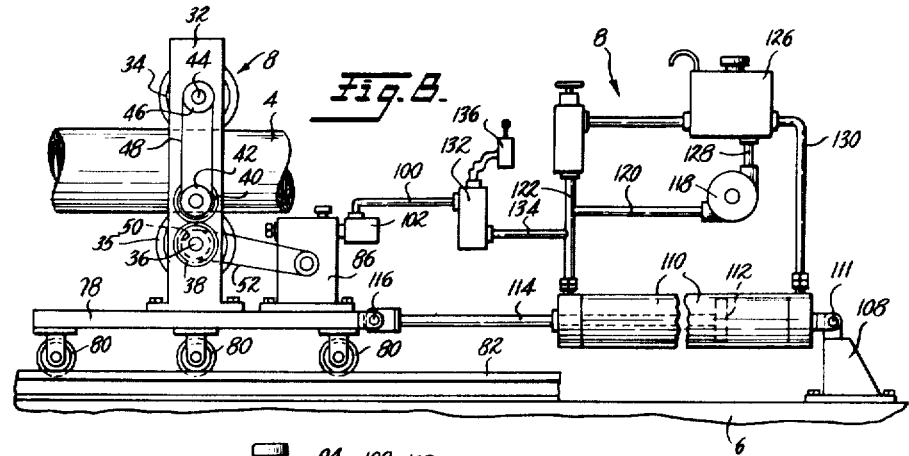
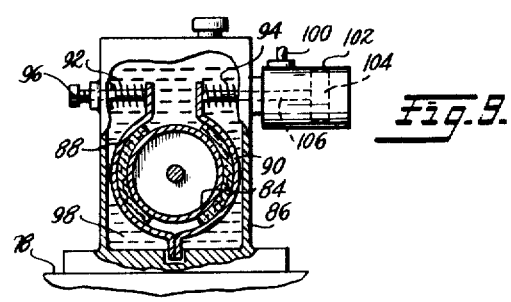

PROPELLER WASH DIVERSION APPARATUS FOR PIPE BARGE

RELATED APPLICATIONS

This application is a divisional application of Ser. No. 587,288, filed Oct. 17, 1966 in the name of Mr. Clarence W. Shaw as inventor, and entitled "Deep Water Lay Barge and Method" now U.S. Pat. No. 3,533,244.

The said application Ser. No. 587,288 was a continuation-in-part of an earlier filed application Ser. No. 364,933, filed May 5, 1964 in the name of Clarence W. Shaw as inventor, and now issued as U.S. Pat. No. 3,321,925.

In marine pipe laying operations the usual procedure is to join mill lengths of pipe together, on a barge, by butt welding and launch them into the water from the barge. This is actually accomplished by moving the barge forward a distance equal to the length of the pipe joint last welded, stopping the barge and aligning and welding another joint. Often such barges are provided with means to contact the ocean bottom in some manner to control the position of the barge and to pull the barge forwardly in steps. That system is for relatively shallow water. The means to contact the ocean bottom is in some cases long cables which are controlled by winches whereby the barge can be quickly and accurately moved along and stopped for each pipe joint welding operation.

Usually steel pipe for underwater use is coated with a corrosion preventing material, and in the larger pipe sizes, weights or weighted coating must be added to prevent the pipe's buoyancy from bringing it to the surface. In the larger pipes, such coatings may be concrete for weight, which is substantially rigid. Such weight coatings usually are designed to give the empty pipe a specific gravity of from 1.05 to 1.50. In launching such pipe from the horizontal or straight position on the barge, it must be allowed to bend convexly on the upper surface in its path to the bottom and again concavely on its upper surface as it approaches the ocean floor to a horizontal position again. The pipe is thus subject to stress and movement from wave action, current and tides and as the depth and weight increase the strains and curvature become unmanageable and the pipe and/or pipe coatings are damaged or destroyed.

According to the invention the portion of the pipe extending from the barge to the bottom is held under forward tension, that is, tension exerted in the direction of movement of the barge. It is a relatively easy matter to maintain a uniform and constant tension on the pipe when the barge is moving forwardly at a substantially uniform speed. However, when the operation is intermittent, such as is necessary when successive lengths of pipe are welded, on the barge to the string of pipe being laid, the barge must be brought to a standstill for each welding operation. Whether the barge is advanced forwardly by means of its own propellers or cables and winches, when it is stationary for a welding operation, there is always the likelihood of lateral or rearward movements which tend to relieve the tension on the pipe and create bending stress problems in the pipe. For example, wave action can cause the barge to rise and fall sufficiently to change the pipe tension quite materially even though the barge may not be moving rearwardly or forwardly. Also, after a barge has been moved forwardly one step and then brought to a standstill, there is often a rearward surge or slight movement rearwardly, which tends to relieve tension on the pipe and cause the same to bend beyond the desired limits.

The present invention seeks to overcome this disadvantage by providing means whereby the tension on the pipe is maintained constant at all times irrespective of any movement of the barge and in any direction. In general, the invention comprises restraining means for frictionally engaging the pipe so that forward movement of the barge will apply a forward force to the pipe. A constant forward force is applied to the friction means, relative to the barge, so that the tendency to pull the pipe forwardly exist and is exerted even though the barge may be moving rearwardly or in any other direction that would tend to relieve pipe tension.

Pipe laying barges of the type referred to usually comprise a downwardly and rearwardly sloping ramp at one side of the barge, down which the pipe is guided into the water. The barge is provided with generally centrally located propeller means for propelling the same forwardly and when tension is applied to the pipe, it is obvious that the forward propelling force, being applied along the center line of the vehicle, and the pipe tension acting along a laterally displaced line, tends to cause the barge to yaw or turn toward the side along which the pipe extends. Furthermore, the portion of the pipe suspended between the barge and the bottom is subject to water movements which can cause undue swaying or vibrations in the pipe. The propeller wash from the barge propeller accentuates this tendency since it disturbs the water in the region of the suspended pipe. Both of the above difficulties are overcome by the present invention by providing a system of guided vanes adjacent but rearwardly of the propeller, which vanes not only direct the propeller wash away from the suspended pipe but also maintain the proper heading for the barge in opposition to the tendency of pipe tension to turn it sideways.

It is, therefore, an object of this invention to provide an improved deep water lay barge capable of accurately maintaining its direction of movement even without contact with the bottom of the body of water on which the barge is supported and with a minimum agitation of pipes suspended between the barge and the bottom.

Another object of the invention is to provide a deep water lay barge capable of maintaining uniform and constant tension on the pipe being laid irrespective of movements of the barge relative to the bottom.

Still another object is to provide an improved deep water lay barge of the type set forth wherein the improvements are relatively simple and economical yet highly reliable in operation.

Further and additional objects and advantages will become apparent to those skilled in the art as the description proceeds with reference to the accompanying drawings wherein:

FIG. 1 is a highly schematic side elevational view of the rear portion of a barge embodying the present invention;

FIG. 2 is a top plan view of FIG. 1;

FIG. 3 is a rear elevational view of the barge of FIG. 1;

FIG. 4 is an enlarged schematic side elevational view of one form of tension applying means;

FIG. 5 is a vertical sectional view taken along the line 5—5 of FIG. 4;

FIGS. 6, 7 and 8 are, respectively, schematic side elevational views of different embodiments of tension applying means; and FIG. 9 is a fragmentary enlarged view with parts broken away of a portion of the apparatus shown in FIG. 8

Referring first to FIGS. 1, 2 and 3, the barge 2 may be of any desired or conventional form provided with the necessary accessories and apparatus for storing and welding pipe lengths into a continuous length of pipe 4. The pipe 4 is directed downwardly and rearwardly along a suitable ramp 6 into the water on which the barge 2 is buoyant. The drawings herein omit the pipe engaging and guiding means commonly provided in the ramp 6 and omit the usual buoyant members supporting that portion of the pipe 4 rearwardly of the barge to control its curvature to the bottom of the body of water. All those means are fully disclosed in the copending application referred to above although other more or less conventional equivalent means may be employed.

According to the present invention a pipe tensioning apparatus 8 is mounted on the barge in position to engage the length of pipe 4 and to apply restraint to relative movement between the barge and pipe. Several modifications of the tensioning means 8 will be described hereinafter but in each case, it applies a forward tension to the pipe 4 at all times. The barge is preferably also provided with a separate clamping device 10 by means of which the pipe 4 may be fixedly clamped to the barge during those intervals of time when an additional pipe joint is being welded in place. When the pipe is so clamped to the barge, thrust of the propeller 12 maintains tension on the pipe. The clamping means 10, however, may be released so that the tensioning means 8 may operate. From FIGS. 2 and 3 it will be readily apparent that the tension in the pipe 4 applies a rearward force to the barge 2 at one lateral extremity thereof. Tension is maintained and the barge is propelled forwardly by propeller means 12, customarily located along the center line of the barge. Thus, the propeller means applies a forward force to the center line of the barge and that force, coupled with the tension of the pipe 4, will normally tend to cause the barge to turn or yaw to the right. Also, it will be apparent that the wash from propeller 12 will normally spread out rearwardly of the barge and cause considerable water agitation in the region of the downwardly and rearwardly extending portion of pipe 4 where it is suspended in the water. That agitation could cause swaying or movements of the pipe that might introduce unwarranted and excessive bending stresses therein. To overcome both of the above disadvantages, the barge is provided with a system of vanes 14 adjacent but rearwardly of the propeller means 12. The system of vanes comprises individual rubberlike vanes 16, each mounted for pivotal movement on a vertical axis defined by a shift 18. The shafts 18 are journalled at their lower ends in a bracket or supporting structure 20 and are journalled near their upper ends in suitable bearing means 22. As shown, three such shafts and vanes are provided so as to extend laterally across an area wider than the propeller means 12 and in position to intercept all of the propeller wash rearwardly thereof. At their upper ends the shafts 18 are each provided with a crank arm 24 and those crank arms are joined by a pivoted link 26, one end of which is pivotally connected to a suitable tiller bar 28 or the like. Thus, when the tiller bar 28 is pivoted about its vertical pivot axis 30, the link 26 will be moved laterally and thus swing all of the vanes 16 in the same direction. As shown in FIG. 2, the vanes 16 are tilted in such direction as to intercept all of the wash from propeller 12 and direct it laterally to the left. This action not only deflects propeller wash away from the suspended pipe 4 but also applies a counter-clockwise movement to the barge to overcome the tendency of the latter to yaw to the right in the manner previously referred to.

Referring now to FIG. 4, which shows a first embodiment of pipe tensioning means 8, there is shown therein a bracket or frame structure 32 mounted on the ramp 6 and straddling the pipe 4. Journalled on the bracket structure 32 is a pair of rubber-tired friction wheels 34 and 35 arranged to frictionally engage the outer surface of the pipe 4. As shown, the axle 36 upon which the lower wheel 35 is fixed, carries a gear 38 fixed thereon, meshing with a second gear 40 rotatably carried by the bracket frame 32 and which is fixed relative to a sprocket wheel 42. The axle 44 upon which the upper wheel 34 is fixed has a sprocket wheel 46 fixed thereto. The sprocket wheels 42 and 46 are drivingly connected by means of a suitable chain 48 so as to ensure synchronous rotation of the wheels 34 and 35 and the gears 38 and 40 cause those wheels to rotate in opposite directions whereby the portions thereof engaging the pipe 4 move in the same direction.

The lower axle 36 has a sprocket wheel 50 fixed thereto and is driven by a chain 52 from a constant torque motor device 54. The motor device 54 is of a known type and may be described as an eddy current electrodynamic torque applying means. This motor has the ability of driving a load with a constant applied torque and of holding said applied torque even when stationary or when the unit is being forcibly rotated rearwardly against the applied torque. Thus, at all times it applies a uniform and constant torque to the lower axle 36 in a direction to urge the lower wheel 35 to rotate in a clockwise direction, as seen in FIG. 4. Obviously, through the described gearing and chains 48 the same constant torque will be applied to the upper wheel 34 in a direction to cause it to urge the pipe 4 forwardly. Hereinafter in this specification applicant will refer to forward rotation of the wheels 34 and 35 as being that direction of rotation which tends to pull the pipe 4 forwardly on the barge 2.

It will be obvious that, with the unit 54 energized, it will apply a predetermined tension on the pipe 4 and that tension will be maintained constant irrespective of whether the barge is moving forwardly, is stationary, or is actually surging rearwardly or even then it is rising and falling due to wave action.

The form of the invention shown in FIG. 6 is similar to that of FIG. 4 and like parts bears the same reference numerals. In this embodiment, however, the eddy current unit 54 is replaced by a hydraulic drive system comprising a pump 56 driven by a suitable motor or other prime mover 58. The pressurized fluid delivered by the pump 56 is fed through a conduit 60 to a fluid pressure operated motor 62, the output of which is drivingly connected to the chain 52 to drive the tensioning means in a forward direction. A return conduit 64 from motor 62, extends through a hydraulic relief and by-pass valve arrangement 66. A heat exchanging reservoir 68 is also provided to hold and cool a supply of hydraulic liquid and to deliver the same to the intake 70 of the pump 56. The relief and by-pass valve means 66 may be of conventional form and operates to control return of liquid through conduit 64 so as to maintain a predetermined and uniform operating pressure in the motor 62, or to completely by-pass the output of pump 56 to the reservoir 68. The Figure is merely schematic and suggests only one possible arrangement of hydraulic circuits, it being obvious to those skilled in the art how a uniform torque hydraulic motor may be employed to apply and maintain a uniform and constant tension on the pipe 4.

FIG. 7 is a further embodiment, shown schematically, and in which parts similar to those previously described bear the same reference numerals. In this embodiment a variable speed motor 72 drives the chain 52 through a fluid coupling or fluid fly wheel device 74. Such fluid couplings are known in the art and need not be described in further detail. It is a known characteristic of such devices that the torque transmitted therethrough is proportional to the speed of the motor 72. Thus, regulation of the speed of motor 72 predetermines the actual torque transmitted to chain 52 and thus to the wheels 34 and 35 which apply tension to the pipe 4. As is customary, the fluid coupling 74 is provided with an external circuit for the fluid therein and which circuit includes a heat exchanger 76 for maintaining the liquid at a desired working temperature. In operation of such fluid coupling devices, the oil customarily used develops considerable heat and constant cooling is necessary.

In the embodiment of FIG. 8, the bracket frame 32 is not mounted or fixed directly on the ramp 6 but is mounted on a carriage 78 provided with wheels 80 riding on suitable guide rails 82, which in turn are fixed on the ramp 6. The chain 52 is not driven in this embodiment to apply any pipe-tensioning torque to the wheels 34 and 35. Instead, the chain 52 is drivingly connected to a drum 84 (see FIG. 9) in a braking unit 86. Within the unit 86 brake shoes 88 and 90 are provided and which are movable into engagement with the drum 84 by springs 92 and 94. Suitable adjusting means 96 are provided to adjust the compression of spring 92 whereby to predetermine the extent of the braking effect and thereby predetermine the tension applied to pipe 4 upon forward movement of the barge 2. Preferably, the braking unit 86 contains a suitable oil or other liquid 98 to control the temperature of frictionally developed heat and to prevent chatter. The spring 94 urges brake shoe 90 into engagement with drum 84 but its effect can be relieved or overcome by applying suitable fluid pressure to a conduit 100 leading into a cylinder 102 in which piston 104 reciprocates. The piston rod 106 of piston 104 is connected at its outer end to the brake shoe 90 whereby sufficient pressure in conduit 100 will retract brake shoe 90 against the force of spring 94 and thus materially reduce the braking effect of the unit 86. As previously described, in some instances or types of operation, the barge is brought to a standstill periodically to permit welding additional pipe lengths onto the string of pipe. Thereafter, the barge is caused to move forwardly. However, the friction brake arrangement applies a static friction to the drum 84 when the barge is stationary and at the commencement of forward movement of the barge a considerably higher tension in pipe 4 would be necessary to start rotation of drum 84 than the amount of tension necessary to maintain rotation of the drum after it is once started. In a manner to be described, the high starting tension referred to increases the pressure in line 100 to thus reduce the actual torque necessary to start rotation of drum 84. Fixed to the ramp 6 is a bracket 109 to which a hydraulic cylinder 110 is secured, as at 111. A piston 112 is positioned in the cylinder 110 and its piston rod 114 extends rearwardly therefrom and is connected, as at 116, to the carriage 78 upon which the frame 32 and braking device 86 are mounted. A hydraulic pump 118, driven by any suitable means, delivers pressure to an outlet conduit 120 and from there to a conduit 122 which is connected at one end thereof to the rearward end of the cylinder 110 and which is connected at its other end to a pressure control valve 124 through which fluid is delivered to a reservoir 126 and to the inlet 128 of the pump 118. As will be apparent, the valve 124 may be adjusted to provide any desired hydraulic pressure in the cylinder 110 rearwardly of the piston 112. That pressure, acting through piston rod 114, applies a forward traction force to the carriage 78 and hence applies a forward tension to the pipe 4, since rotation of the wheels 34 is restrained by the braking device 86. As shown, a conduit 130 connects the reservoir 126 with the forward end of cylinder 110 to provide a vent therefrom thus preventing entrapment of fluid pressure forwardly of the piston 112. The conduit 100, previously referred to, is connected to a valve device 132 between the conduit 100 and conduit 134 connected to the conduit 122, previously referred to. Thus, the pressure applied to the rear of piston 112 is also fed into the valve device 132 which is set to remain closed until the fluid pressure exceeds a predetermined value. Thus, when the barge is stationary the springs 92 and 94 apply braking restraint to rotation of drum 84 and the hydraulic pressure acting on piston 112 applies a forward force to the carriage 78 to hold the desired tension in pipe 4. However, when the barge first starts to move forwardly the high static friction on the drum 84 would normally result in a sudden increase in pipe tension. Under these circumstances, forward movement of the barge also increases the pressure rearwardly of the piston 112 since movement of the barge tries to pull cylinder 110 forwardly and pipe tension resists forward movement of the piston 112. This increase in hydraulic pressure is fed through conduit 134 and is effective to open valve 132 to transmit that pressure through conduit 100 into cylinder 102 and thus compress spring 94 and relieve at least part of the braking force on the drum 84. The parts are so constructed and adjusted that the remaining braking force will just maintain the desired tension on the pipe 4 during this starting interval. As soon as the drum 84 starts to rotate, due to forward movement of the barge, the pressure in cylinder 110 returns to that value determined by the output of pump 118 and the setting of valve 124. At this time the valve 132 again closes and vents pressure from the cylinder 102 by means not shown but known to those skilled in the art, and the desired tension is maintained on pipe 4 at all times. A manual switch 136 is also provided for selectively rendering the valve 132 and brake release means inoperative during welding and no clamp, such as clamp 10 of the previous embodiments is necessary, although one may be provided, if desired.

As stated previously, the apparatus shown in the Figures is merely shown schematically to illustrate the principles of operation. Many modifications will become obvious to those skilled in the art, for example, separate torque applying means may be arranged for each of the wheels 34 and 35 rather than having those wheels drivingly connected together by a chain such as that shown at 48. Furthermore, for deep water operation and particularly when laying large diameter pipe, a single wheel 34 or 35 or even a pair of wheels 34 and 35 would not be sufficient to develop the necessary pipe tension. In such instances, it is contemplated that the number of wheels engaging the pipe will be increased to any necessary number.

While a limited number of embodiments are shown and described herein, it is to be noted that the invention is not limited thereto but encompasses other embodiments falling within the scope of the appended claims.

What is claimed is:

1. Apparatus for laying a pipeline in a body of water comprising:
   a buoyant vehicle having propeller means thereon for propelling the vehicle through water;
   guide means on said vehicle, laterally of said propeller means, for guiding said pipeline from said vehicle; and
   selectively adjustable means associated with said propeller means for directing propeller wash laterally away from said pipeline.

2. Apparatus as defined in claim 1 wherein said selectively adjustable means comprise rudder-like vane means pivotally mounted on a vertical axis on said vehicle adjacent but rearwardly of said propeller means and arranged to deflect the entire propeller wash laterally of said vehicle.

3. Apparatus as defined in claim 2 wherein said vane means comprises a plurality of vanes spanning an area extending laterally past both sides of said propeller means.

4. Apparatus for laying continuous nonbuoyant pipe in a body of water comprising:
   a buoyant vehicle having propeller means thereon for propelling the vehicle forwardly;
   guide means on said vehicle, laterally of said propeller means for guiding said pipe rearwardly from said vehicle; and
   selectively adjustable means associated with said propeller means for directing propeller wash laterally away from said pipe and for directing said vehicle forwardly in opposition to the tendency of said pipe to turn said vehicle.

5. Apparatus as defined in claim 4 wherein said selectively adjustable means comprise rudder-like vanes disposed rearwardly of said propeller means and extending laterally past both sides of said propeller means to deflect the entire propeller wash in a direction away from said pipe.

6. In an apparatus for laying continuous nonbuoyant pipeline in a body of water wherein the pipeline is guided off of a buoyant lay barge vehicle having a propulsion means thereon, which propulsion means results in generation of disturbed water in the nature of a propeller wash, the improvement which comprises:
   selectively adjustable means associated with said propulsion means for directing agitated water created by said propulsion means laterally away from said pipe.

7. The apparatus as defined in claim 6 wherein said selectively adjustable means comprises rudder-like vane means disposed rearwardly of said propulsion means and spanning an area extending laterally past both sides of said propulsion means to deflect the entire wash from said propulsion means laterally of said pipe.

* * * * *

UNITED STATES PATENT OFFICE
CERTIFICATE OF CORRECTION

Patent No. 3,670,510                Dated June 20, 1972

Inventor(s) Clarence W. Shaw

It is certified that error appears in the above-identified patent and that said Letters Patent are hereby corrected as shown below:

In the title, after "PIPE", insert --LAY--.

Column 1, line 73, "exist" should be --exists--.

Column 3, line 20, "rubberlike" should be --rudderlike--.

Column 3, line 22, "shift 18" should read --shaft 18--.

Signed and sealed this 26th day of December 1972.

(SEAL)
Attest:

EDWARD M. FLETCHER, JR.                ROBERT GOTTSCHALK
Attesting Officer                      Commissioner of Patents